United States Patent
Porfyrakis et al.

(10) Patent No.: US 9,187,328 B2
(45) Date of Patent: Nov. 17, 2015

(54) METHODS AND APPARATUS FOR THE PRODUCTION OF CARBON-CONTAINING MATERIALS

(75) Inventors: Kyriakos Porfyrakis, Oxford (GB); Simon R. Plant, Oxford (GB)

(73) Assignee: Isis Innovation Limited, Oxford, Oxfordshire (GB)

( * ) Notice: Subject to any disclaimer, the term of this patent is extended or adjusted under 35 U.S.C. 154(b) by 797 days.

(21) Appl. No.: 13/254,589

(22) PCT Filed: Mar. 3, 2010

(86) PCT No.: PCT/GB2010/050373
§ 371 (c)(1),
(2), (4) Date: Nov. 16, 2011

(87) PCT Pub. No.: WO2010/100492
PCT Pub. Date: Sep. 10, 2010

(65) Prior Publication Data
US 2012/0070355 A1   Mar. 22, 2012

(30) Foreign Application Priority Data
Mar. 3, 2009   (GB) .................................. 0903600.5

(51) Int. Cl.
| | | |
|---|---|---|
| *B01J 8/00* | (2006.01) | |
| *C01B 31/02* | (2006.01) | |
| *B01J 19/08* | (2006.01) | |
| *B82Y 30/00* | (2011.01) | |
| *B82Y 40/00* | (2011.01) | |

(52) U.S. Cl.
CPC ........... *C01B 31/0226* (2013.01); *B01J 19/088* (2013.01); *B82Y 30/00* (2013.01); *B82Y 40/00* (2013.01); *C01B 31/0213* (2013.01); *B01J 2219/0809* (2013.01); *B01J 2219/0811* (2013.01); *B01J 2219/0818* (2013.01); *B01J 2219/0822* (2013.01); *B01J 2219/0828* (2013.01); *B01J 2219/0839* (2013.01)

(58) Field of Classification Search
CPC ..................................................... B01J 19/088
See application file for complete search history.

(56) References Cited

U.S. PATENT DOCUMENTS

| | | |
|---|---|---|
| 5,227,038 A | 7/1993 | Smalley et al. |
| 5,482,601 A | 1/1996 | Ohshima et al. |
| 5,494,558 A | 2/1996 | Bunshah et al. |
| 6,645,438 B1 | 11/2003 | Dubrovsky |
| 7,208,132 B2 | 4/2007 | Bolskar et al. |
| 7,358,343 B2 | 4/2008 | Dorn et al. |
| 7,364,709 B2 * | 4/2008 | Anazawa et al. ........ 422/186.21 |
| 7,504,132 B2 * | 3/2009 | Afzali-Ardakani et al. .. 427/256 |
| 2004/0057896 A1 | 3/2004 | Kronholm et al. |
| 2004/0262145 A1 | 12/2004 | Duzhev et al. |
| 2005/0019245 A1 | 1/2005 | Koulikov |
| 2005/0034668 A1 | 2/2005 | Garvey et al. |
| 2006/0280689 A1 | 12/2006 | Xiang et al. |
| 2008/0217161 A1 | 9/2008 | Mathur et al. |

FOREIGN PATENT DOCUMENTS

| | | |
|---|---|---|
| JP | 06026462 A | 2/1994 |
| JP | 06183712 A | 7/1994 |
| JP | 08217430 A | 8/1996 |
| KR | 2004 0090651 A | 10/2004 |
| WO | 03/064321 A1 | 8/2003 |
| WO | 2004/035463 A2 | 4/2004 |
| WO | 2006/019329 A1 | 2/2006 |

* cited by examiner

*Primary Examiner* — Stuart Hendrickson
(74) *Attorney, Agent, or Firm* — Hodgson Russ LLP

(57) ABSTRACT

The present invention provides various methods and apparatus for the production of fullerenes and other carbon-containing materials. In some aspects, the invention provides an arc chamber comprising a graphite element support, wherein the support comprises a rotatable frame adapted for moving each graphite element towards and away from an arc discharge position. In other aspects, the invention provides a collection chamber for collecting carbon-containing materials produced in an arc chamber, wherein the collection chamber comprises an inlet and a rotatable element arranged to direct the carbon-containing material to a wall of the collection chamber, wherein the sectional area occupied by the rotatable element increases with distance from the inlet. In other aspects, the invention provides a collection chamber comprising means for isolating the collection chamber from an arc discharge apparatus and an inlet for the introduction of solvent into the collection chamber.

11 Claims, 4 Drawing Sheets

METHODS AND APPARATUS FOR THE PRODUCTION OF CARBON-CONTAINING MATERIALS

FIELD OF THE INVENTION

This invention relates to methods and apparatus for the production of carbon-containing materials. Preferred embodiments relate to methods and apparatus for use in the production of fullerenes or carbon nanotubes. Aspects of the invention find particular application in the production of endohedral fullerenes, in particular of fullerene cages comprising inserted atoms or molecules, and/or other carbon-containing structures and materials.

BACKGROUND TO THE INVENTION

Fullerenes are a relatively recently discovered class of carbon-based materials and are spherical molecules with a "hollow" interior. Such cage-like structures can trap atoms and molecules inside. Such molecules are known as endohedral fullerenes. To date, some success has been achieved in encapsulating group III metals (Sc, Y), lanthanides (Ce, Gd, Pr, Ho and others), group II metals (Ca, Sr, Ba), group V elements (N, P) and noble gases (He, Ne, Ar, Kr and Xe) in fullerenes. The main problem for the commercial exploitation of these new molecules is their limited production and their unavailability in truly macroscopic quantities.

Existing methods for fullerene synthesis include the Krätschmer-Huffman method (W. Krätschmer, L. D. Lamb, K. Fostiropoulos and D. R. Huffman, Nature, 347, (1990) 354-358). By this method, graphitic carbon soot is produced by evaporating graphite electrodes in an atmosphere of helium; the soot is shown to contain fullerenes.

Endohedral fullerenes are generally sensitive to ambient conditions and a fullerene collection chamber for the anaerobic collection of fullerenes has been proposed by H. Shinohara (H. Shinohara, Rep. Prog. Phys., 63, (2000) 843-892), but the use of the proposed collection glove box has proved time consuming to use. There is considerable downtime for the apparatus while removing the soot from the collection chamber.

Moreover, in known arc discharge systems, a collection vessel may comprise a condensing wall which is cooled, for example, using liquid nitrogen. The hot carbon-containing vapour entering the chamber is cooled at the condensing wall and soot comprising the target carbon-containing compounds is deposited onto the condensing wall. In conventional collection vessels, a gas outlet is provided in the collection vessel. For example where helium gas flows into the collection vessel with the carbon-containing vapour, the helium gas exits the vessel through the outlet. The outlet is normally provided with a filter for capturing carbon-containing material which might otherwise pass through the outlet. It would be advantageous for more of the carbon-containing material to be deposited in the vessel rather than reaching the filter.

It is an object of one or more aspects of the present invention to solve or at least mitigate one or more of these or other problems. In particular, one or more aspects seek to provide a continuous or semi-continuous process for the production of fullerenes and other carbon-containing materials.

SUMMARY OF THE INVENTION

According to a first aspect of the present invention, there is provided an apparatus for the production of carbon-containing materials, the apparatus comprising: an arc chamber; a graphite element support for supporting a graphite element in the chamber at an arc discharge position; and means for forming an arc in the chamber to effect vaporisation of material of the graphite element in the arc discharge position; wherein the graphite element support is adapted for moving the graphite element towards and away from the arc discharge position.

Also provided is a method of producing carbon-containing materials comprising: supporting a graphite element in an arc chamber at an arc discharge position; forming an arc in the chamber to effect vaporisation of material of the graphite element in the arc discharge position; and moving the graphite element towards and away from the arc discharge position.

In particular, there is provided an apparatus for the production of carbon-containing materials, the apparatus comprising:
   an arc chamber;
   a graphite element support for supporting a plurality of graphite elements in the chamber, wherein the graphite element support comprises a rotatable frame adapted for moving each graphite element towards and away from an arc discharge position; and
   means for forming an arc in the chamber to effect vaporisation of material of a graphite element in the arc discharge position.

Also provided is a method of producing carbon-containing materials in an arc chamber, the method comprising:
   supporting a plurality of graphite elements on a graphite element support in the chamber, wherein the graphite element support comprises a rotatable frame adapted for moving each graphite element towards and away from an arc discharge position;
   rotating the frame such that a graphite element is moved towards the arc discharge position;
   forming an arc in the chamber to effect vaporisation of material of the graphite element in the arc discharge position; and
   rotating the frame such that said graphite element is moved away from the arc discharge position.

In this way it is possible for a semi-continuous process to be provided, with a new graphite element being introduced to the arc discharge position when the previous one is spent.

According to another aspect of the invention, there is provided a collection chamber for collecting carbon-containing material produced in an arc chamber, the collection chamber comprising: an inlet for receiving carbon-containing material from the arc chamber; and a movable element arranged to direct the carbon-containing material to a wall of the collection chamber.

Also provided is a method of collecting carbon-containing material produced in an arc chamber, the method comprising: receiving carbon-containing material from the arc chamber in the collection chamber; and moving a movable element to direct the carbon-containing material to a wall of the collection chamber.

In particular, there is provided a collection chamber for collecting carbon-containing material produced in an arc chamber, the collection chamber comprising:
   an inlet for receiving carbon-containing material from the arc chamber; and
   a rotatable element arranged to direct the carbon-containing material to a wall of the collection chamber, wherein the sectional area occupied by the rotatable element increases with distance from the inlet.

Also provided is a method of collecting carbon-containing material produced in an arc chamber, the method comprising:
receiving carbon-containing material produced in the arc chamber in a collection chamber, wherein the collection chamber comprises an inlet through which the carbon-containing material is introduced and a rotatable element, wherein the sectional area occupied by the rotatable element increases with distance from the inlet; and
rotating the rotatable element such that the carbon-containing material is directed to a wall of the collection chamber.

According to a further aspect of the invention, there is provided a collection apparatus for collecting carbon-containing material produced in an arc discharge apparatus, the collection apparatus comprising:
a collection chamber for receiving carbon-containing material from the arc discharge apparatus;
means for isolating the collection chamber from the arc discharge apparatus; and
an inlet for the introduction of solvent into the collection chamber.

Also provided is a method of collecting carbon-containing material produced in an arc discharge apparatus, the method comprising:
receiving carbon-containing material from the arc discharge apparatus in a collection chamber;
isolating the collection chamber from the arc discharge apparatus; and
introducing a solvent into the collection chamber.

The invention also provides an apparatus for the production of carbon-containing materials, the apparatus comprising:
(a) an arc chamber;
(b) a graphite element support for supporting a plurality of graphite elements in the arc chamber, wherein the graphite element support comprises a rotatable frame adapted for moving each graphite element towards and away from an arc discharge position;
(c) means for forming an arc in the arc chamber to effect vaporisation of material of a graphite element in the arc discharge position; and
(d) a collection chamber, wherein the collection chamber comprises:
(i) an inlet for receiving carbon-containing material from the arc chamber;
(ii) a rotatable element arranged to direct the carbon-containing material to a wall of the collection chamber, wherein the sectional area occupied by the rotatable element increases with distance from the inlet;
(iii) means for isolating the collection chamber from the arc chamber; and
(iv) an inlet for the introduction of solvent into the collection chamber.

Also provided is a method of producing carbon-containing materials in an arc chamber, the method comprising:
supporting a plurality of graphite elements on a graphite element support in the arc chamber, wherein the graphite element support comprises a rotatable frame adapted for moving each graphite element towards and away from an arc discharge position;
rotating the frame such that a graphite element is moved towards the arc discharge position;
forming an arc in the chamber to effect vaporisation of material of the graphite element in the arc discharge position;
rotating the frame such that said graphite element is moved away from the arc discharge position;
receiving carbon-containing material produced in the arc chamber in a collection chamber, wherein the collection chamber comprises an inlet through which the carbon-containing material is introduced and a rotatable element, wherein the sectional area occupied by the rotatable element increases with distance from the inlet;
rotating the rotatable element such that the carbon-containing material is directed to a wall of the collection chamber;
isolating the collection chamber from the arc discharge apparatus; and
introducing a solvent into the collection chamber.

Advantageously, methods and apparatus of the present invention may allow fullerenes and other carbon-containing materials to be produced in a continuous or semi-continuous manner.

DESCRIPTION OF VARIOUS EMBODIMENTS

Figure 1:
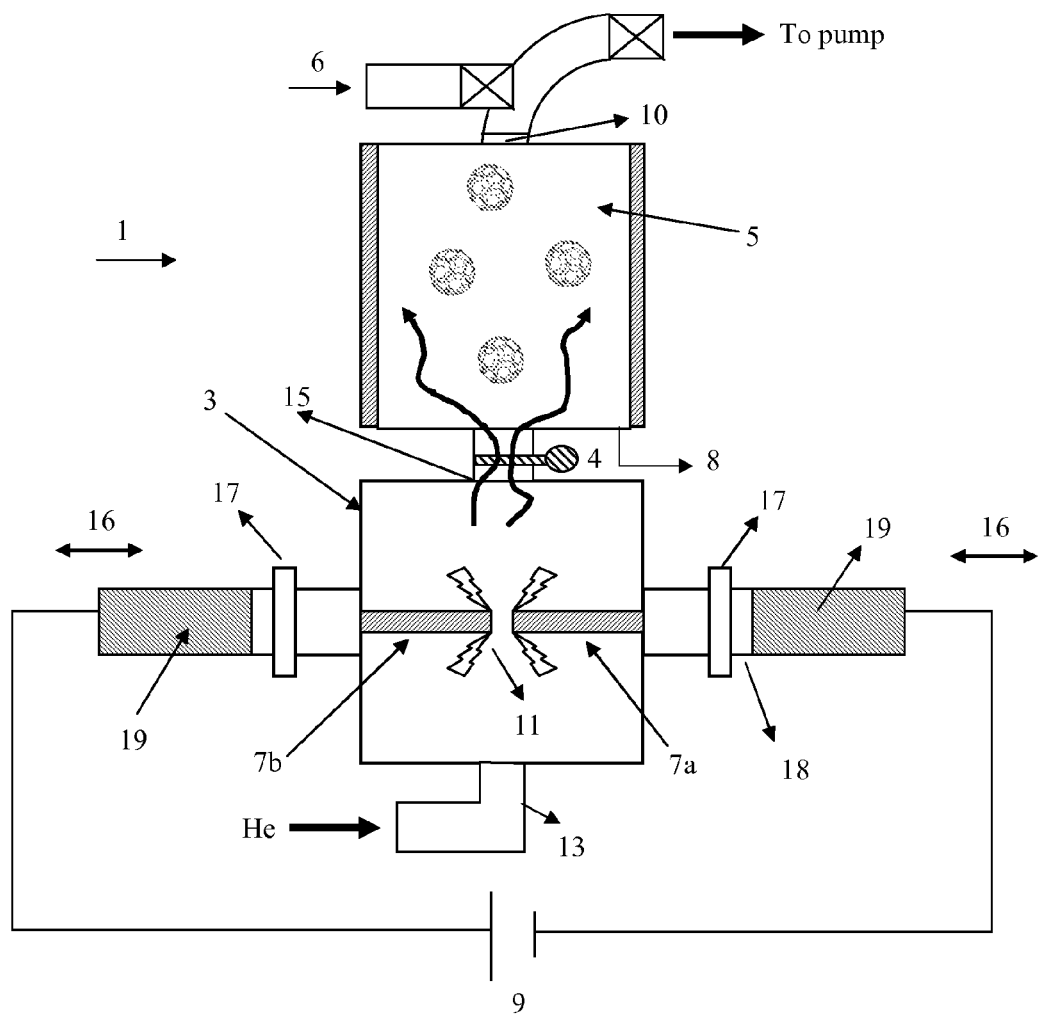
FIG. 1 shows schematically an electric arc discharge apparatus for the production and collection of fullerenes.

Where reference is made to a graphite element or graphite rod herein, preferably the reference should be interpreted broadly to include any element including graphitic carbon. Preferably the element comprises mostly carbon. In preferred examples, the element is doped with one or more components. Such doped elements can be used for example in the production of endohedral fullerenes.

Where reference is made to carbon-containing materials, preferably the reference should be interpreted broadly to include any composition containing carbon. Preferably, the element is substantially inorganic. In examples of the invention, a variety of carbon-containing materials are produced. The carbon-containing materials sought to be produced may include, but are not restricted to, fullerenes, carbon-based spheres, ellipsoids, tubes and planes. The carbon-containing material may comprise other components, for example as a part of the carbon structure, and/or captured within the carbon structure, for example as in endohedral fullerenes. It will be understood that the application of the invention is not restricted as to the particular material to be made.

In one aspect, there is provided an apparatus for the production of carbon-containing materials, the apparatus comprising: an arc chamber; a graphite element support for supporting a graphite element in the chamber at an arc discharge position; and means for forming an arc in the chamber to effect vaporisation of material of the graphite element in the arc discharge position; wherein the graphite element support is adapted for moving the graphite element towards and away from the arc discharge position.

Preferably the apparatus comprises one or more graphite element supports, for supporting a plurality of graphite elements in the chamber. Preferably the arrangement is such that each of the plurality of graphite elements can be moved sequentially to the arc discharge position. Where a plurality of supports are provided, they may be movable independently, or their movement may be linked together.

Preferably the apparatus comprises a frame for supporting a plurality of graphite elements. In preferred embodiments a plurality of elements are mounted to a common movable substrate.

Any mode of movement in the chamber is contemplated. In examples described herein, the frame is rotatable to move the elements towards and away from the arc discharge position.

The apparatus may comprises one or more graphite elements. Preferably the one or more graphite elements comprise graphite rods.

The apparatus may comprise means for supporting a secondary graphite element such that the arc passes between the graphite elements at the arc discharge position. The secondary graphite element may for example comprise a graphite block. In some examples, the graphite element is movable towards and away from a position adjacent the graphite block. Alternatively, the secondary graphite element may comprise a further graphite rod. The secondary graphite element may be movable in the chamber. In preferred arrangements, the graphite elements and the secondary element are movable independently of each other. In alternative arrangements, the movement may be linked.

The apparatus may further comprise a graphite element in the chamber, the graphite element being connected to a current source. The current source may provide an alternating or a direct current.

A graphite element may comprise graphitic carbon and a dopant. The dopant may comprise one or more atoms, molecules of other components. For example, the dopant may comprise a metal or other element for insertion in a fullerene structure to form an endohedral fullerene. As discussed further below, the dopant may be included in a mix with the carbon material and/or the element may comprise channels, cavities or other formations, the formations comprising dopant material.

The apparatus may comprise a plurality of graphite elements, including two graphite elements having a different composition.

The apparatus may comprise means for applying at least a partial vacuum to the interior of the arc chamber.

The apparatus may comprise means for supplying a gas to the chamber. Helium gas is used in examples described herein. Another inert gas could be used, or the gas might comprise a reactive gas, for example containing a component to be inserted into a carbon structure to form an endohedral fullerene and/or to react with a component of the graphite element.

The apparatus may comprise means for advancing the element in the chamber during the vaporisation process. By advancing the element as the graphite is evaporated and the element is eroded, the desired position of the element in the chamber can be maintained. Where there are two elements provided in the chamber with the arc forming at a gap between the two, one or both of the elements may be advanced as the vaporisation progresses.

The apparatus may comprise means for determining the relative position of the element in the chamber, the means for advancing the element being controlled on the basis of the determination. Devices for the determination may be located in a region of the chamber. The device may comprise a viewing window.

The apparatus may comprise means for supporting two graphite elements in the chamber, the elements being a predetermined distance apart from each other.

The apparatus may comprise a plurality of electrodes, wherein each electrode is attachable to a graphite element in the chamber. Preferably the graphite elements form at least a part of the electrode itself.

Movement of one or more graphite elements, such as for example one or more graphite elements supported on a rotatable frame, may be automated using automation means known in the art. In this regard, a computer programmed with suitable software (e.g. LabView software) may be used.

The present invention also provides a method of producing carbon-containing materials comprising: supporting a graphite element in an arc chamber at an arc discharge position; forming an arc in the chamber to effect vaporisation of material of the graphite element in the arc position; and moving the graphite element towards and away from the arc discharge position.

Preferably the method further comprises supporting a secondary graphite element and passing the arc between the graphite elements at the arc discharge position. Preferably the method further comprises moving the secondary graphite element in the chamber.

Preferably the method further comprises applying at least a partial vacuum to the interior of the arc chamber.

The arc chamber may comprise an outlet for carbon-containing material, the outlet being in communication with an inlet of a collection chamber.

Also provided is a method and apparatus for collecting carbon-containing material comprising providing in the collection chamber means for forming a spiral flow of gas in the chamber. As indicated above, this spiral flow may be formed by use of a rotating element in the chamber. The spiral flow may comprise a flow of, for example, helium gas in the chamber.

The apparatus may comprise a collection chamber for collecting carbon-containing material from the arc chamber, the collection chamber comprising flow directing means for directing the carbon-containing material towards a wall of the collection chamber.

This feature may be provided independently. Therefore, an aspect of the invention provides a collection chamber for collecting carbon-containing material produced in an arc chamber, the collection chamber comprising: an inlet for receiving carbon-containing material from the arc chamber; and flow directing means for directing the carbon-containing material towards a wall of the collection chamber.

Preferably the flow directing means is associated with the inlet of the collection chamber. In this way, the flow directing means can direct a flow of material as it enters the chamber. The flow directing means may comprise for example a formation at the inlet of the collection chamber, and/or a formation within the chamber itself. The flow directing means may comprise a movable element mounted in the collection chamber, preferably a rotatable element. The rotation of the element preferably has the effect of directing carbon-containing material to a wall of the collection chamber.

The invention also provides a collection chamber for collecting carbon-containing material produced in an arc chamber, the collection chamber comprising: an inlet for receiving carbon-containing material from the arc chamber; and a movable element arranged to direct the carbon-containing material to a wall of the collection chamber.

Where the movable element comprises a rotatable element, preferably the axis of rotation of the element is arranged generally in a direction from the inlet to an outlet of the collection chamber. The element preferably tapers from the outlet to the inlet of the collection chamber. Preferably the sectional area of the element perpendicular to the axis of rotation is less at the inlet than at the outlet. For instance, the rotatable element may comprise a generally conical element mounted with its apex facing the inlet. In this way, the sectional area occupied by the rotating element increases with distance from the inlet. Thus as the flow of the carbon-containing material is directed by the rotating element, the possibility of condensing on the wall of the chamber is increased. Thus, in some examples, the rotatable member can act to impede the flow of the carbon-containing material to the outlet, and also improve deposition of the carbon-containing material on the wall of the vessel.

One or more surface formations may be provided on the rotatable element, for example vanes or fins. Such formations may enhance the movement of the carbon-containing material to the walls of the chamber.

The speed of movement of the movable element may be chosen to give the desired movement of the material in the chamber. Where the element is rotatable, the speed of rotation may be, for example, 2000 to 3000 revolutions per minute.

The wall of the collection chamber is preferably cooled. By cooling the wall of the chamber, the carbon-containing material is preferentially deposited there compared with, say, the rotatable member. The means for cooling the wall may comprise a source of liquid nitrogen.

The arrangement is preferably such that the temperature of the rotatable element is greater than that of the chamber wall. Thus the carbon-containing material is condensed preferentially on the wall of the chamber rather than on the rotatable element.

Isolation means may be provided between the collection chamber and the arc chamber. The isolation means may comprise for example a valve. In this way it is possible to isolate the collection chamber from the arc chamber. Thus the carbon-containing material can be recovered from the collection chamber without affecting the arc chamber. Indeed, in some arrangements, the operation of the arc chamber may be continued even when the collection chamber is not available. The apparatus may be provided with more than one collection chamber, for example each collection chamber being connectable to one or more of a plurality of outlets of the arc chamber. By selectively opening a connection between the arc chamber and one or more of the collection chambers, continuous collection into the collection chambers can be achievable.

The invention also provides a method of collecting carbon-containing material produced in an arc chamber, the method comprising: receiving carbon-containing material from the arc chamber in the collection chamber; and moving a movable element to direct the carbon-containing material to a wall of the collection chamber.

Preferably the method comprises the step of rotating the movable element. In preferred arrangements, the rotation of the element provides a substantially spiral flow path in the collection chamber.

The movable element may comprise a generally conical element, having its apex in the region of an inlet of the collection chamber.

Preferably the collection chamber comprises a solvent inlet for the introduction of solvent to the collection chamber. Preferably the solvent can be added anaerobically.

This feature is of particular importance and is provided independently. Therefore, a further aspect of the invention provides a collection apparatus for collecting carbon-containing material produced in an arc discharge apparatus, the collection apparatus comprising: a collection chamber for receiving carbon-containing material from the arc discharge apparatus; means for isolating the collection chamber from the arc discharge apparatus; and an inlet for the introduction of solvent into the collection chamber.

Preferably the inlet is such that the solvent can be introduced to the collection chamber in situ. Preferably, the solvent can be introduced without disconnecting the collection chamber from the arc discharge apparatus. In some arrangements, the collection chamber comprises means for releasably attaching the collection chamber to the arc apparatus. In other arrangements, the connection may be a more permanent one.

Preferably the inlet is such that solvent can be introduced into the collection chamber substantially anaerobically.

Preferably a solvent reservoir is connected to the solvent inlet of the collection chamber. Preferably the solvent reservoir comprises a solvent storage container into which appropriate solvent can be introduced. The solvent storage container is preferably a part of the collection apparatus and is in liquid connection with the collection vessel. A controllable valve is preferably provided in a channel between the solvent reservoir and the collection chamber so that flow of the solvent from the reservoir to the collection chamber can be controlled. Preferably the solvent is stored in the reservoir during the production and collection of the carbon-containing material.

Preferably the apparatus comprises a valve for controlling flow of solvent from the reservoir into the collection chamber. Preferably the solvent reservoir is connected to the collection chamber during the collection of the carbon-containing material.

When the collected material is to be removed from the collection chamber, the collection chamber may be isolated from the arc discharge apparatus (for example using a valve, e.g. a gate valve or ball valve). The valve between the solvent reservoir is opened and solvent flows into the collection chamber to wash the carbon-containing material from the walls of the chamber.

Once the target carbon-containing material, for example endohedral fullerenes, has been collected by the solvent, the material is more tolerant to exposure to the atmosphere, and the solvent comprising the carbon-containing material may be removed by any convenient method.

Preferably the collection chamber further comprises a solvent outlet, and the solvent comprising the carbon-containing materials can be drained from the collection chamber.

An appropriate solvent or mixture of solvents may be used depending on the target carbon-containing materials. For example, for the collection of endohedral fullerenes, polar solvents such as dimethylformamide (DMF) or non-polar solvents such as toluene and xylene, may be used.

Preferably the pressure in the collection chamber is lower than that in the solvent reservoir. Thus, on opening of the valve, solvent is injected into the collection chamber.

If the collection chamber comprises a movable member, for example a rotatable element, preferably it is moved or rotated during the washing of the material from the collection chamber.

Also provided by the invention is a method of collecting carbon-containing material produced in an arc discharge apparatus, the method comprising: receiving carbon-containing material in a collection chamber from the arc discharge apparatus; isolating the collection chamber from the arc discharge apparatus; and controlling flow of solvent from a reservoir into the collection chamber.

The invention also provides a method of collecting carbon-containing material produced in an arc discharge apparatus, the method comprising: providing a collection chamber connected to the arc discharge apparatus; supplying carbon-containing material from the arc discharge apparatus to the collection chamber; isolating the collection chamber from the arc discharge apparatus; and supplying solvent into the collection chamber.

Preferably during the supply of solvent into the collection chamber, the collection chamber remains connected to the arc discharge apparatus.

Preferably the solvent is supplied from a solvent reservoir connected to the collection chamber. Preferably the solvent reservoir is connected to the collection chamber during the supply of carbon-containing material from the arc discharge apparatus.

Preferably the solvent is supplied to the collection chamber substantially anaerobically.

The method may further comprise the step of removing solvent and carbon-containing material from the collection chamber. Preferably the solvent and carbon-containing material is removed from the collection chamber while the collection chamber is connected to the source of carbon-containing material.

In another aspect, the invention provides a method and apparatus for use in the production of carbon-containing materials, the apparatus comprising a plurality of graphite elements in an arc chamber, the apparatus further comprising means for selectively applying a current to one or more of the elements to form an arc in the chamber, the arc effecting vaporisation of material from one or more of the elements. Thus in some arrangements, it is envisaged that the elements might remain static and the electrodes or other component would be moved relative to the elements.

Preferably the carbon-containing materials comprise fullerenes, in particular endohedral fullerenes.

Any feature in one aspect of the invention may be applied to other aspects of the invention, in any appropriate combination. In particular, method aspects may be applied to apparatus aspects, and vice versa.

Preferred features of the present invention will now be described, purely by way of example, with reference to the accompanying drawings.

FIG. 1 illustrates an arc reactor for the production of fullerenes. The arc reactor 1 shown in FIG. 1 comprises an arc chamber 3, wherein the arc chamber comprises a steel-walled vessel of generally cylindrical shape which is mounted having its axis generally horizontal. The chamber may be of any suitable shape and be formed of any suitable material which can withstand the heat and pressures of the process. In use, a vacuum or partial vacuum is applied to the chamber 3. Two graphite rods 7a, 7b are mounted in the arc chamber 3 and are brought together in close proximity. The rods 7a, 7b are connected to a DC power supply 9 and a high current is passed through them. Alternatively, an AC current may be used. An electric arc 11 forms and the rods 7a, 7b begin to evaporate. During vaporisation, the ends of the rods are held apart to give a small gap between the rods 7. The size of the gap will depend on various factors, but may be for example 3 to 4 mm. Helium gas is introduced via gas inlet 13 into the chamber 3 at a pressure of about 50 to 100 mbar. The soot produced by the evaporating rods 7a, 7b is carried through the arc chamber 3, by convection and the flow of gas, through outlet 15 to a collection chamber 5. The collection chamber 5 comprises a nitrogen-cooled collection vessel. Soot passing into the collection chamber 5 condenses on the cooled walls. Once the vaporisation of the graphite rods is complete, the soot is removed from the walls of the collection chamber 5 for extraction and further processing.

In the arc chamber 3, as the graphitic material from the rods 7a, 7b is vaporised, the rods are eroded. To maintain a suitable gap between the rods, one or both of the rods can be advanced. In the arrangement shown in FIG. 1, two rod feed devices 16 are provided, each comprising a CF flange 17, insulation 18 and a electrical and mechanical feed mechanism 19. A viewing window (not shown in FIG. 1) is provided in a wall of the arc chamber 3 so that the progress of the vaporisation of the rods can be seen and the rods advanced appropriately.

As shown in FIG. 1, soot produced by vaporisation of the graphite rods then passes out of the arc chamber 3 to the collection chamber 5. During the vaporisation stage, the valve 4 between the arc chamber 3 and the collection chamber 5 is open. The walls of the collection chamber 5 are cooled using liquid nitrogen and carbon-containing material condenses on to the walls of the chamber 5. Once the collection is complete, the collection chamber 5 is isolated from the arc chamber 3 by closing the valve 4. Solvent is then introduced into the chamber through an inlet port 6 and is used to wash the soot comprising the carbon-containing materials from the walls. Some of the material will be dissolved in the solvent, and the mixture comprising the dissolved and undissolved components is removed from the collection chamber through an outlet 8. Once the target materials in the soot have been dissolved in the solvent, they are less sensitive to air, and the solvent mixture can be removed from the collection chamber by opening the chamber in ambient conditions.

In the arrangement of FIG. 1, a filter 10 is arranged at the outlet of the chamber 5 to prevent the carbon-containing materials and other materials flowing into the pump. In some arrangements, a baffle, for example a plate or other formation may be placed in front of the outlet of the chamber to direct air flow collect at the top of the chamber and to collect further material which might otherwise reach the filter 10.

Figure 2:
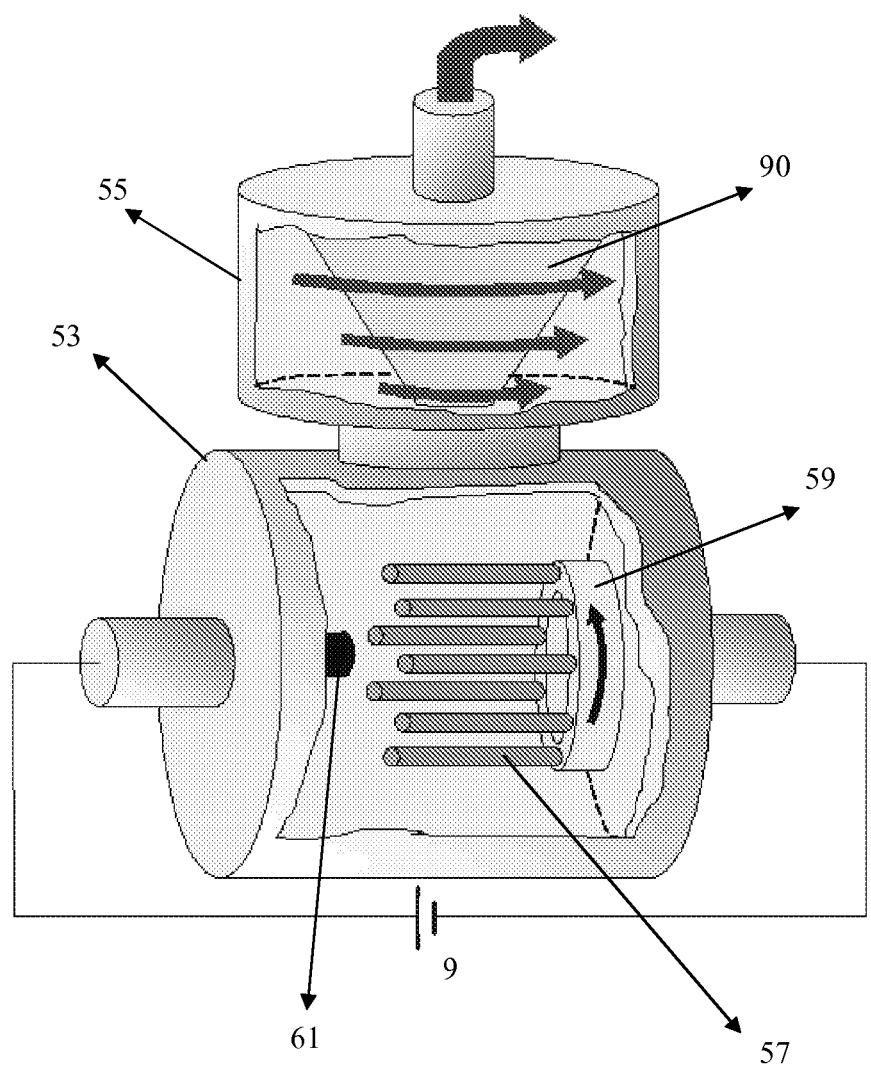
FIG. 2 shows a cut away view of a vaporisation chamber and collection chamber of an electric arc discharge apparatus for the production and collection of fullerenes.

FIG. 2 shows an alternative example of an arc discharge apparatus. The apparatus illustrated in FIG. 2 has a greater potential capacity than that of FIG. 1. In the apparatus shown in FIG. 2 the arc chamber 53 houses an array of graphite rods 57 arranged adjacent and substantially parallel to each other and mounted on a rotatable frame 59. In the arrangement shown in FIG. 2, the frame 59 is in the form of a ring and seven rods are mounted substantially evenly spaced about its perimeter. Rotating frame 59 is connected to one of the electrodes of the power supply 9. The other electrode is connected to a graphite block 61 mounted in the arc chamber 53 in the region of the ends of the rods 57 remote from the frame 59.

In use, the operator opens the arc chamber only once for mounting a plurality of graphite rods 57 in rotating frame 59. After the chamber 53 is evacuated and helium flows through the chamber at the required pressure, one by one the rods 57 are evaporated against the graphite block 61. As the rod 57 is eroded, it (and/or the block) is advanced to keep the desired gap between the rod 57 and the block 61. When the rod is spent, the frame 59 is rotated to expose another rod 57 to the block 61 and this further rod is evaporated. Thus, a plurality of rods 57 can be evaporated before opening of the chamber 53 and reloading of rods 57 needs to be carried out.

Figure 3:
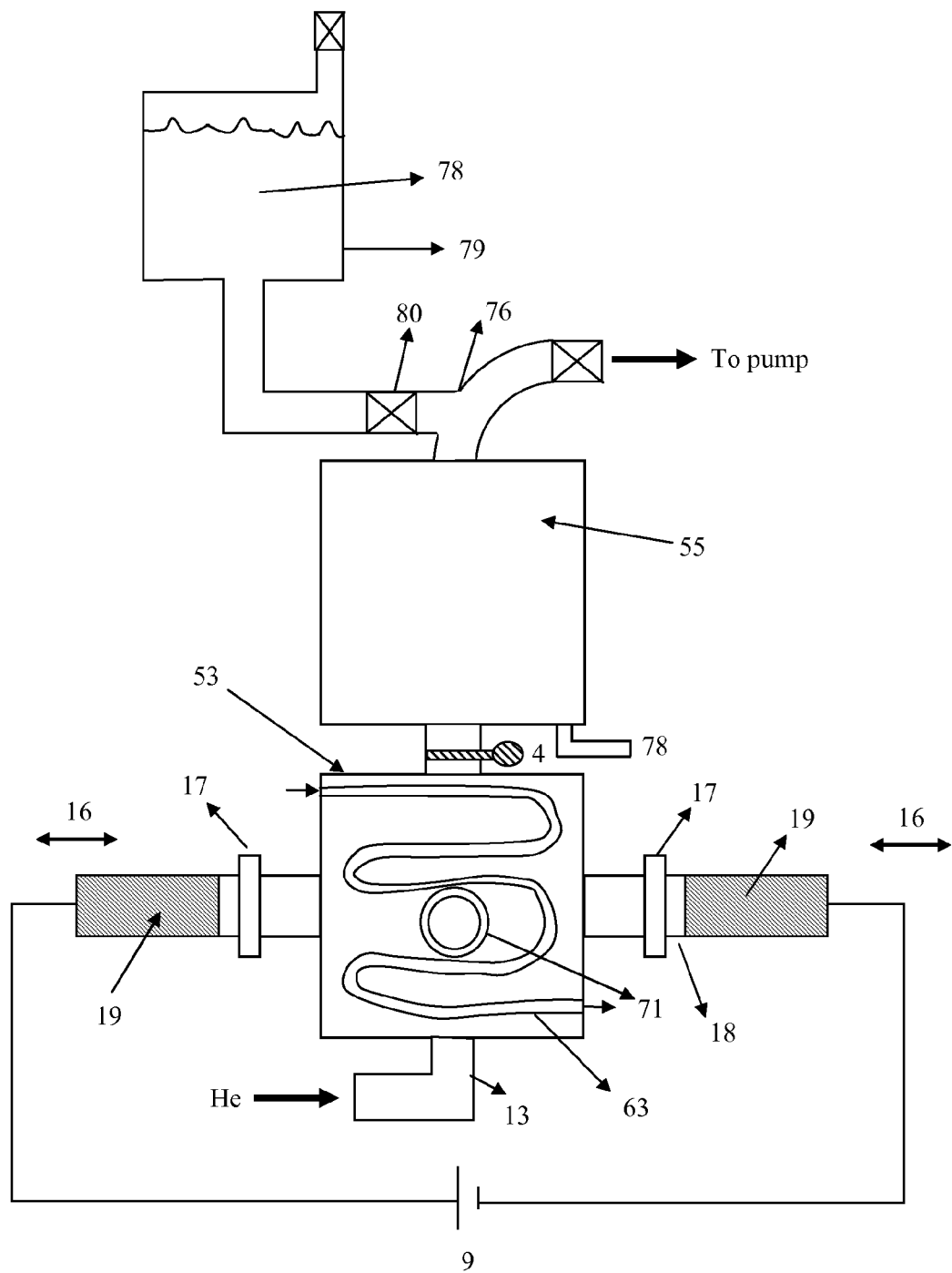
FIG. 3 shows a further example of an electric arc discharge apparatus for the production and collection of fullerenes.

The operator can control the advance of the rods and the rotation of the rods 57 on the frame 59 by viewing the arrangement through a viewing window 71 (see FIG. 3). The rotatable frame 59 can be operated manually or, for example electrically or pneumatically. The rods 57 may be advanced by translating the frame 59 towards the block 61, or individual rods 57 may be advanced. The rod advancing mechanism may be an electrical/mechanical feedthrough mechanism similar to those described in FIG. 1. The feedthrough mechanism may be manually, electrically or pneumatically driven. Instead of, or in addition to the viewing window, other devices for monitoring parameters of the vaporisation process may be provided. For example a camera may be provided to view the rod and the arc. Devices may be provided to monitor other related parameters, for example the current supplied to the rods, and information from the devices may be used to control the process, for example the advance of the rods in the chamber 53.

In each of the various aspects and embodiments herein, the rods or other elements preferably mainly comprise graphite. The graphite elements may comprise other components, for example dopants, additives or catalysts. For example catalysts can be included to increase production of particular type of target fullerene or other carbon-containing material, for example carbon nanotubes. As an example, to form La@$C_x$-type endohedral fullerenes, a graphite rod doped with between 0.8% and 1.0% by weight of La could be used. By using a graphite rod doped with about 1.6% by weight of lanthanum oxide $La_sO_2$, $La_2$@$C_x$-type endohedral fullerenes may be formed.

The doped rods may be formed by any appropriate method. For example, the rods may be formed by mixing graphite with the required dopant(s) and forming the mixture into a block and subsequently cutting rods from the block. The doped-graphite rods may be purchased from commercial sources (e.g. Toyo-Tanso Co., Ltd., Japan).

Alternatively, or in addition, dopant can be added to pre-formed rods, for example by drilling holes, channels or other formations in the rods and filling the cavities or other formations with a composition comprising the required dopant.

One or more dopants can be provided in the rods. More than one different dopant or amounts of a dopant can be included in a single rod and/or different dopants could be provided in different rods, for example in opposing rods or blocks.

Different rods or blocks in an array can have different dopants, mixtures or amounts of dopants. Selection of the pairing of blocks and rods can give desired components for the carbon vapour produced and therefore tune the production of particular fullerenes and endohedral fullerenes.

Similar considerations apply for other types of graphite elements for example blocks.

In the examples described, helium gas is used. Alternatively, or in addition, other gases could be used, for example other inert gases. In some cases reactive gases, and/or gases having a catalytic function may be used. The gas may comprise atoms, molecules or other components for insertion into the carbon-containing material produced, for example as endohedral insertions, and/or as a part of the carbon structure itself.

In alternative examples, different arrangements of the graphite elements are possible. For example a different number of elements may be used, they may have a different shape, a different arrangement of the elements on the frame or other support or supports may be used. A different frame may be used. In other arrangements, the elements may be individually mounted on a movable support.

An appropriate size of element will be chosen. For graphite rods, the longer the rod, the more vaporised carbon material can be obtained from each element, but long rods can in some arrangements prove problematic, in particular where the rod or other element is used to conduct the electricity required for producing and maintaining the arc. In some arrangements, the preferred maximum length of each rod or element is about 30 to 40 cm. In some arrangements, elements up to 50 cm long, or more, might be used. Any appropriate sectional area of rod or other element may be used. In the arrangement described, each rod may for example have a cross sectional area of about 1 to 2 $cm^2$.

In an alternative example, the graphite block of FIG. 2 may be replaced by a second array of rods. The second array of rods may be mounted on a frame as for the array shown in FIG. 2 and be movable in a similar way. The second array of rods may be movable independently of the first array, or its movement may be tied with the movement of the first array so that each rod is paired with one of the other array, movement of the support frames or other moving mechanism bringing pairs or individual rods into the arc discharge position where current can be applied.

In a further alternative arrangement, the array of rods may be fixed, and a movable electrode may selectively apply current to individual rods, for example in a predetermined sequence. As an alternative, each element may be associated with its own current supply which may be selectively activated. Different combinations and variations are possible. Current may be applied to more than one rod of an array at the same time. Thus the arc chamber may support more than one simultaneous arc.

FIG. 2 also illustrates an improved collection chamber 55 which comprises a rotatable cone element 90 mounted inside the chamber. The cone element 90 is mounted having its apex 92 facing the inlet into the collection chamber 55. A drive mechanism is provided for rotating the cone element about its axis. When the valve 4 is open and helium gas flows through the chamber 55, it is urged into a spiral path around the rotating cone element 90 as shown schematically by the path A in FIG. 4. The channelling of the gas may be facilitated by the presence of formations, for example vanes or fins 93 on the surface of the cone element. The spiral path of the gas passing through the collection chamber 55 encourages deposition of the carbon-containing materials on the walls of the chamber 55. In this arrangement, the walls of the chamber 55 are cooler than those of the rotating cone element 90 and thus the material is deposited preferentially on the walls of the chamber 55. At the end of the collection operation, the collection chamber 55 is isolated from the arc chamber 53 and remains in a low-pressure helium atmosphere. Then the solvent is introduced in the collection chamber 55, thus achieving anaerobic dissolution of the soot material.

Another advantage of the design is that, since the collection chamber 55 can be isolated from the arc chamber 53, the latter can be opened when the set of graphite rods have been evaporated and a new set can be mounted for semi-continuous operation. This can increase production and reduce the time that the system need to be evacuated between operations cycles.

FIG. 3 shows an arc reactor comprising the arc chamber 53 of FIG. 2. In the arc reactor of FIG. 3, the mechanism for advancing the rods may be similar to that of FIG. 1, although an alternative arrangement may be used, as appropriate. During the vaporisation of the carbon elements, the temperature in the arc chamber 53 may reach as much as 3000 or 4000° C. Cooling of the chamber is advantageously provided. In the example shown in FIG. 3, a cooling pipe 63 containing chilled water or other cooling fluid is provided on the external surface of the chamber 53, but other arrangements are possible. The power supply may comprise a DC supply 9 supplying a current of for example 100 to 300 A. In some arrangements it is preferred for the polarity to be reversed periodically, for example every 10 minutes, to improve vaporisation. In alternative arrangements, an AC power supply may be used.

In the arrangement of FIG. 3, a solvent reservoir 79 comprising a solvent 78 is connected to the collection chamber 55 via inlet 76. A valve 80 is located between the reservoir 79 and the collection chamber 55 to control flow of the solvent into the collection chamber 55. Once the collection is complete, the valve 4 is closed to isolate the collection chamber 55 from the arc chamber 53, and the solvent control valve 80 is opened. The low pressure in the collection chamber 55 acts to suck solvent from the reservoir 79 into the collection chamber. Subsequently, the mixture of the solvent and the carbon-containing material can be removed from the collection chamber 55, for example via outlet 78. The solvent used to wash out the collection chamber 5, 55 will be chosen in dependence on the target materials to be collected. For example, where endohedral fullerenes are the target molecules, the solvent may comprise toluene, carbon disulfide, o-xylene or other organic solvents. The collected solvent mixture can then be further processed to extract the target materials, for example using high performance liquid chromatography (HPLC) in accordance with known methods.

Figure 4:
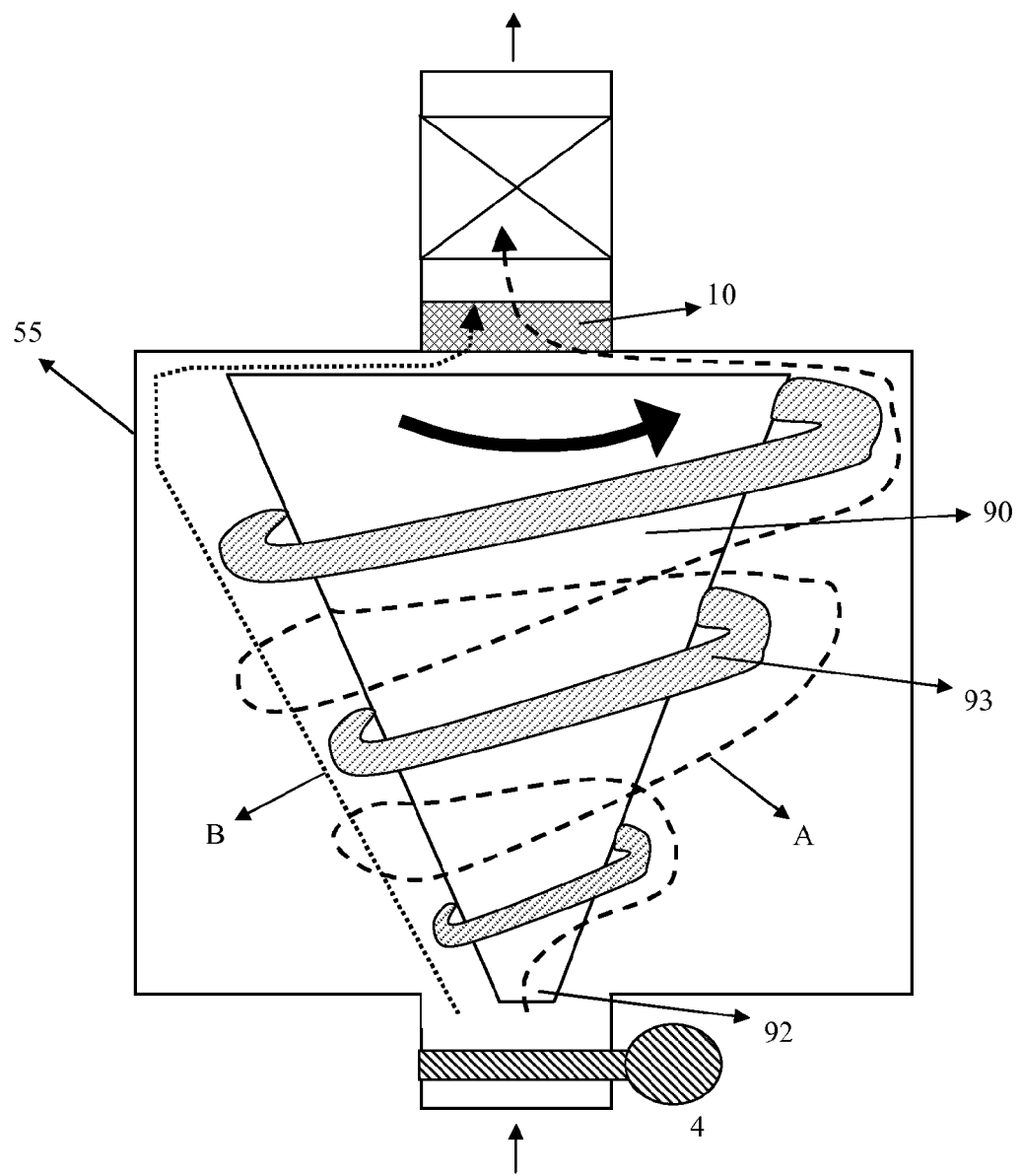
FIG. 4 illustrates schematically the path of gas flow in the collection chamber of FIG. 2.

As mentioned above, FIG. 4 shows the path of gas flow in the collection chamber of FIG. 2. The apparatus shown in FIG. 4 can also be used without rotating the cone element 90. The static cone element 90 also has an effect of directing flow towards the walls of the chamber 55 thus increasing deposition on the walls. This path is illustrated in FIG. 4 as path B. Any appropriate method may be used to rotate the cone element 90. A conical element 90 is shown in this example, although other shapes could be used. For example the rotating element may be of frustoconical shape. Preferably the shape of the element is such that its width increases from the inlet to the outlet of the chamber 55. The pressure of the helium in the collection chamber 55 may be for example 50 to 60 mbar. Once the material has been collected, the valves are closed to isolate the collection chamber and solvent is injected into the chamber to dissolve the target molecules, for example in the arrangement of FIG. 3 by opening valve 80 to allow solvent 78 to be drawn into the collection chamber 55.

Other variations are possible within the scope of aspects of the invention. For example, the collection chamber 5, 55 is shown in each example as being located above the arc chamber 3, 53. However, other configurations are possible, and the collection chamber 55 may be located to the side of the arc chamber 3, 53. The chambers may be any appropriate shape; preferably the collection chamber has generally cylindrical shape. Material may also be collected from the arc chamber 53.

Thus aspects of the invention provide an arc reactor apparatus which can be used for the scaled up synthesis of endohedral fullerenes. It is expected that the reactor apparatus in some examples can be used to produce gram quantities annually of target endohedral fullerene materials. The synthesis can be optimised by using a semi-continuous operation by providing an array of graphite rods in the arc chamber. The collection chamber arrangement can allow for a semi-continuous process for the anaerobic collection of the reaction products.

It will be understood that the present invention has been described above purely by way of example, and modification of detail can be made within the scope of the invention. Each feature disclosed in the description, and where appropriate the claims and drawings may be provided independently or in any appropriate combination.

The invention claimed is:

1. An apparatus for the production of fullerenes, the apparatus comprising:
   an arc chamber;
   a graphite element support for supporting a plurality of graphite elements in the arc chamber, wherein the graphite element support comprises a rotatable frame adapted for moving each graphite element towards and away from an arc discharge position;
   means for forming an arc in the arc chamber to effect vaporisation of material of a graphite element in the arc discharge position;
   a collection chamber in communication with the arc chamber, wherein the collection chamber comprises an inlet for receiving fullerenes from the arc chamber and a rotatable element configured to rotate and direct the fullerenes to a wall of the collection chamber, wherein the inlet of the collection chamber is located above the arc chamber, and wherein the rotatable element is a conical element arranged with its apex facing the inlet; and
   means for supplying a gas to the arc chamber.

2. An apparatus according to claim 1, which comprises a plurality of the graphite element supports.

3. An apparatus according to claim 1, further comprising means for supporting a secondary graphite element such that the arc passes between the secondary graphite element and one of said plurality of graphite elements in said position.

4. An apparatus according to claim 1, which comprises a current source connected to one of the graphite elements.

5. An apparatus according to claim 1, further comprising means for applying at least a partial vacuum to the interior of the arc chamber.

6. An apparatus according to claim 1, further comprising means for advancing the graphite elements in the arc chamber during vaporisation.

7. An apparatus according to claim 1, further comprising a plurality of electrodes, wherein each of the electrodes is attachable to one of the graphite elements in the arc chamber.

8. An apparatus according to claim 3, wherein the secondary graphite element is movable in the arc chamber.

9. An apparatus according to claim 6, further comprising means for determining the relative position of the graphite elements in the arc chamber, the means for advancing the graphite elements being controlled on the basis of the determination.

10. An apparatus according to claim 1, wherein the apparatus further comprises means for isolating the collection chamber from the arc chamber and the collection chamber comprises a solvent inlet for the introduction of solvent into the collection chamber.

11. An apparatus according to claim 10, wherein the solvent inlet is arranged such that solvent can be introduced into the collection chamber under substantially anaerobic conditions.

* * * * *